United States Patent [19]

Yamamoto

[11] Patent Number: 5,437,804
[45] Date of Patent: Aug. 1, 1995

[54] SOLID POLYMER ELECTROLYTE

[75] Inventor: Takakazu Yamamoto, Yokohama, Japan

[73] Assignee: Yuasa Corporation, Takatsuki, Japan

[21] Appl. No.: 66,935

[22] Filed: May 25, 1993

Related U.S. Application Data

[63] Continuation-in-part of Ser. No. 837,103, Feb. 18, 1992, abandoned, which is a continuation of Ser. No. 410,855, Sep. 22, 1989, abandoned.

[51] Int. Cl.$^6$ .............................................. H01M 4/88
[52] U.S. Cl. ............................... 252/62.2; 252/182.1; 429/190; 429/192
[58] Field of Search ............................ 252/182.1, 62.2; 429/190, 192

[56] References Cited

U.S. PATENT DOCUMENTS

| | | | |
|---|---|---|---|
| Re. 33,040 | 8/1989 | Kakiuchi | 252/62.2 |
| 2,759,132 | 8/1956 | Ross | 252/62.2 |
| 2,977,514 | 3/1961 | Myers et al. | 292/62.2 |
| 3,353,072 | 11/1967 | Peck et al. | 252/62.2 |
| 3,916,267 | 10/1975 | Yasuda et al. | 252/62.2 |
| 4,110,015 | 8/1978 | Reddy | 252/62.2 |
| 4,272,616 | 6/1981 | Kishimoto | 252/518 |
| 4,317,691 | 3/1982 | Katsuta et al. | 149/2 |
| 4,731,311 | 3/1988 | Suzuki et al. | 429/213 |
| 4,806,571 | 2/1989 | Knobel et al. | 252/518 |
| 4,822,701 | 4/1989 | Ballard et al. | 252/62.2 |
| 4,855,077 | 8/1989 | Shikinami et al. | 252/518 |
| 4,952,466 | 8/1990 | Cipriano et al. | 429/192 |
| 5,219,679 | 6/1993 | Abraham et al. | 429/192 |
| 5,252,413 | 10/1993 | Alamgir et al. | 429/192 |

*Primary Examiner*—Edward A. Miller
*Attorney, Agent, or Firm*—Watson, Cole, Grindle & Watson

[57] ABSTRACT

A solid polymer electrolyte which has excellent heat resistance and high mechanical strength is prepared by incorporating an alkali metal salt or an alkaline earth metal salt into polyvinyl alcohol. The electrolyte can further contain a polar solvent and/or polyether to provide an elevated ionic-conductivity.

5 Claims, No Drawings

SOLID POLYMER ELECTROLYTE

CROSS-REFERENCE TO RELATED APPLICATIONS

This application is a continuation-in-part of application Ser. No. 837,103, filed Feb. 18, 1992, now abandoned, which was a continuation of application Ser. No. 410,855, filed Sep. 22, 1989, now abandoned.

BACKGROUND OF THE INVENTION

FIELD OF THE INVENTION

The present invention relates to a solid polymer electrolyte to be used in batteries, electrochromic displays, condensers and other electrochemical devices.

Hitherto, solid polymer electrolytes have included complexes composed of a polymer material having polyethylene oxide, polypropylene oxide or ethylene oxide-propylene oxide copolymer in the main chain or side chains and an alkali metal salt or alkaline earth metal salt.

The polyether material in the solid polymer electrolyte has the drawback that it inconveniently softens at an elevated temperature and the mechanical strength thereof is thereby lowered since it has a low glass transition temperature (for instance, the glass transition temperature of polyethylene oxide is $-67°$ C.).

SUMMARY OF THE INVENTION

The present invention has been effected so as to overcome the noted problem, and the object thereof is to provide a solid polymer electrolyte which has excellent heat-resistance and high mechanical strength and which is inexpensive and can be utilized widely.

In order to satisfy the object, there is provided in accordance with the present invention a solid polymer electrolyte which is composed of polyvinyl alcohol and an alkali metal salt or alkaline earth metal salt.

DETAILED DESCRIPTION OF THE INVENTION

Various materials have been investigated and it has been found that, among various conventional polymers, polyvinyl alcohol, which has the same helical structure as that of polyethylene oxide, brings about a good result.

Specifically, the alkali metal ion or alkaline earth metal ion forms a complex together with the hydroxyl group of the polyvinyl alcohol to display an excellent ionic-conductivity.

The polyvinyl alcohol for use in the present invention is one generally obtained by saponification of polyvinyl acetate. Polyvinyl acetate (PVAc) hydrolyzes or saponifies into polyvinyl alcohol (PVAc) according to formula 1:

$$-(CH_2-CH)- \quad + H_2O-(CH_2-CH)-(CH_2-CH)- \quad (1)$$
$$\underset{PVAc}{OCOCH_3} \qquad\qquad OH \qquad OCOCH_3$$
$$+ CH_3COOH$$

Commercial polyvinyl alcohol contains the ester group due to incomplete hydrolysis or saponification. The proportion of saponification for PVA is defined as

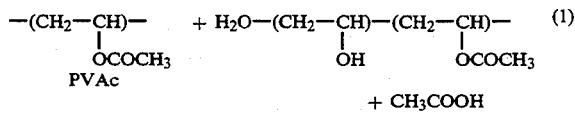

Commonly available commercial PVA has a degree of saponification of $85\pm5\%$; however, polyvinyl alcohols having different proportions of saponification are known. Naturally, when the amount of the hydroxyl groups in the polyvinyl alcohol is small, the ionic-conductivity of the solid polymer electrolyte is low since the dissociation of the alkali metal salt or alkaline earth metal salt therefrom is retarded. Accordingly, the polyvinyl alcohol having the proportion of saponification of 100% displays the highest ionic-conductivity. However, there is no problem for practical use when the proportion of saponification is 80% or more.

The concentration of the alkali metal salt or alkalineearth metal salt to be incorporated into the polyvinyl alcohol is suitably from 0.10 to 0.60 times the number of moles of the hydroxyl groups in the polyvinyl alcohol.

For incorporating the alkali metal salt or alkaline earth metal salt into the polyvinyl alcohol, the polyvinyl alcohol and the metal salt are dissolved in a common solvent and thereafter the solvent is removed from the resulting solution to obtain a solid. Alternatively, a solid polyvinyl alcohol is dipped in a solution containing the metal salt so that the solid polyvinyl alcohol is doped with the metal salt.

As another characteristic feature of the present invention, a non-aqueous polar solvent may be applied to the polyvinyl alcohol to form a solution whereby a part or all of the salt in the polyvinyl alcohol is formed into an adduct with the non-aqueous polar solvent, thereby greatly increasing the ionic-conductivity of the solid polymer electrolyte. In place of the non-aqueous polar solvent, polyether may be applied to the polyvinyl alcohol and the same effect of improving the ionic-conductivity is attained. Further, addition of the non-aqueous polar solvent to the polyether-containing polyvinyl alcohol gives a much higher ionic-conductivity.

The ionic-conductivity may further vary in accordance with the molecular weight of the polyvinyl alcohol itself. Desirably, the molecular weight of the polyvinyl alcohol for use in the present invention is from 8,000 to 50,000 in view of the ionic-conductivity and also of the mechanical strength of the solid polymer electrolyte.

The polyether to be employed for the purpose is not specifically limited but any and every polyether can be used. However, polyethylene oxide or ethylene oxide-propylene oxide copolymer, especially random copolymer, is preferred.

The non-aqueous polar solvent to be employed for the purpose is also not specifically limited. However, dimethylsulfoxide, heated glycol, piperazine, heated glycerin, dimethylformamide, formamide and diethylenetriamine are preferred in view of the compatibility with polyvinyl alcohol, and aprotic heteroatomic solvents which are well compatible with polyether, such as propylene carbonate, are also preferred. The salt to be contained in the solid polymer electrolyte of the present invention is preferably an alkali metal salt or alkaline earth metal salt, as having a high ionic-conductivity. However, other metal salts, as well as ammonium salts or alkylammonium salts, can also be used.

The alkali metal salt and alkaline earth metal salt for use in the present invention are not specifically limited, but lithium salts are preferred.

In particular, salts of $LiClO_4$, $LiBF_4$, $LiAsF_6$, $LiCF_3SO_3$, $LiI$, $LiBr$ and $LiPF_6$ are preferred.

The present invention will be illustrated in more detail by way of the following examples, which, however, are not intended to restrict the scope of the present invention.

EXAMPLE 1

100 mg of polyvinyl alcohol (proportion of saponification: 98.5%, molecular weight: 25,000) and 103 mg of lithium trifluoromethylsulfonate (molar ratio to OH is 0.3) were uniformly dissolved in 1 ml of dimethylsulfoxide and cast on a plastic support and dried at room temperature in vacuum for 72 hours to remove the dimethylsulfoxide therefrom. Accordingly, a 180 $\mu m$ film was obtained.

The film was cut into a disk, 15 mm-diam. This was sandwiched between 13 mm-diam. platinum electrodes and the ionic-conductivity was obtained by complex impedance method. In this case, the ionic-conductivity was $4.4 \times 10^{-5}$ $Scm^{-1}$ at 25° C. and $3.0 \times 10^{-4}$ $Scm^{-1}$ at 78.5° C.

Comparative Example

Another sample was prepared in the same manner as in Example 1, except that 25.5 mg of lithium trifluoromethylsulfonate (molar ratio to OH is 0.073) was used, and the ionic-conductivity was measured. As a result, it was $1.34 \times 10^{-7}$ $Scm^{-1}$ at 78.6° C.

EXAMPLE 2

Other samples were prepared in the same manner as in Example 1, except that polyvinyl alcohol (proportion of saponification: 88%, molecular weight: 25,000) was used and the amount of lithium trifluoromethylsulfonate ($Li(CF_3SO_3)$) was varied as indicated in Table 1 below, and the ionic-conductivity thereof was measured.

The data (at 25° C.) are shown in Table 1.

TABLE 1

| No. | Amount of $Li(CF_3SO_3)$ added (mg) | $Li^+$/OH (by mol) | Ionic-Conductivity ($Scm^{-1}$) |
| --- | --- | --- | --- |
| 1 | 23.5 | 0.084 | $7.0 \times 10^{-7}$ |
| 2 | 51.3 | 0.185 | $4.2 \times 10^{-4}$ |
| 3 | 69.2 | 0.250 | $1.2 \times 10^{-5}$ |
| 4 | 98.8 | 0.357 | $8.4 \times 10^{-5}$ |
| 5 | 154.0 | 0.556 | $4.1 \times 10^{-6}$ |

Investigating the infrared absorption spectrum of the sample No.3 in Table 1, a dimethylsulfoxide-specific absorption was noted at 300 $cm^{-1}$. Accordingly, the sample was confirmed to contain dimethylsulfoxide therein. The sample was dried at 80° C. in vacuum for 9 hours to remove the dimethylsulfoxide therefrom in such degree that no IR absorption was noted at 3000 $cm^{-1}$, and accordingly, the ionic-conductivity lowered to $4.9 \times 10^{-3}$ $Scm^{-1}$.

The noted phenomenon indicates that incorporation of a polar solvent such as dimethylsulfoxide in the solid polymer electrolyte causes noticeable elevation of the ionic conductivity of the polymer electrolyte.

EXAMPLE 3

100 mg of polyvinyl alcohol (proportion of saponification: 98.5%, molecular weight: 10,000) and 103 mg of lithium trifluoromethylsulfonate (molar ratio to OH is 0.3) were uniformly dissolved in 1 ml of dimethylsulfoxide and cast on a plastic support and dried at room temperature in vacuum for 72 hours to remove the dimethylsulfoxide therefrom. Accordingly, a 180 $\mu m$ film was obtained.

The film was cut into a disk, 15 mm-diam. This was sandwiched between 13 mm-diam. platinum electrodes and the ionic-conductivity was obtained by complex impedance method. In this case, the ionic-conductivity was $9.2 \times 10^{-5}$ $Scm^{-1}$ at 25° C. and $5.3 \times 10^{-4}$ $Scm^{-1}$ at 78.5° C.

EXAMPLE 4

100 mg of polyvinyl alcohol (proportion of saponification: 98.5%, molecular weight: 10,000), 60 mg of polyethyleneoxide-triol (molecular weight: 3,000) and 103 mg of lithium trifluoromethylsulfonate (molar ratio to OH is 0.3) were uniformly dissolved in 1 ml of dimethylsulfoxide and cast on a plastic support and dried at room temperature in vacuum for 72 hours to remove the dimethylsulfoxide therefrom. Accordingly, a 180 $\mu m$ film was obtained.

The film was cut into a disk, 15 mm-diam. This was sandwiched between 13 mm-diam. platinum electrodes and the ionic-conductivity was obtained by complex impedance method. In this case, the ionic-conductivity was $1.3 \times 10^{-4}$ $Scm^{-1}$ at 25° C. and $8.2 \times 10^{-4}$ $Scm^{-1}$ at 78.5° C.

Also in Examples 3 and 4, the residual dimethylsulfoxide was confirmed.

Also is obvious from the results in the above-mentioned examples, the polyvinyl alcohol containing a metal salt such as tithium trifluoromethylsulfonate has a high ionic-conductivity.

Moreover, the polyvinyl alcohol has a high glass transition temperature (85° C.) and has excellent heat-resistance and high mechanical strength.

In addition, the polyvinyl alcohol is a popular substance and is more inexpensive than the other conventional polyether type solid polymer electrolytes.

As explained in detail in the above, the-present invention provides a widely usable and inexpensive solid polymer electrolyte having excellent heat-resistance and high mechanical strength, and the industrial value of the invention is extremely noticeable.

While the invention has been described in detail and with reference to specific embodiments thereof, it will be apparent to one skilled in the art that various changes and modifications can be made therein without departing from the spirit and scope thereof.

What is claimed is:

1. A solid polymer electrolyte which consists of a lithium salt in polyvinyl alcohol and an adduct of said lithium salt and a non-aqueous polar solvent, said lithium salt being present in an amount such that the number of moles thereof is 0.10 to 0.60 the number of moles of hydroxyl groups in said polyvinyl alcohol, said polyvinyl alcohol having a proportion of saphonification from 80% to 100% and a molecular weight of 8,000 to 50,000, and said polyvinyl alcohol constituting 38 to 80% by weight of said solid polymer electrolyte.

2. A solid polymer electrolyte which consists of a lithium salt in polyvinyl alcohol, an adduct of said lithium salt and a non-aqueous polar solvent, and a polyether, said lithium salt being present in an amount such that the number of moles thereof is 0.10 to 0.60 the number of moles of hydroxyl groups in said polyvinyl alcohol, said polyvinyl alcohol having a proportion of saphonification from 80% to 100% and a molecular weight of 8,000 to 50,000, and said polyvinyl alcohol constituting 38 to 80% by weight of said solid polymer electrolyte.

3. The solid polymer electrolyte according to claim 1, wherein the non-aqueous polar solvent is dimethylsulfoxide.

4. The solid polymer electrolyte according to claim 2, wherein the polyether is polyethylene oxide.

5. The solid polymer electrolyte according to claim 2, wherein the polyether is ethylene oxide-propylene oxide random copolymer.

* * * * *